United States Patent [19]
Yotsuya

[11] Patent Number: 6,118,634
[45] Date of Patent: Sep. 12, 2000

[54] FLYING TYPE HEAD SLIDER AND DISK DRIVE APPARATUS WITH THE FLYING TAPE HEAD SLIDER

[75] Inventor: Michio Yotsuya, Kanagawa, Japan

[73] Assignee: Sony Corporation, Tokyo, Japan

[21] Appl. No.: 08/341,149

[22] Filed: Nov. 16, 1994

[30] Foreign Application Priority Data

Nov. 17, 1993 [JP] Japan ................................. 5-311257

[51] Int. Cl.[7] ................................. G11B 5/60; G11B 5/48
[52] U.S. Cl. ................................. 360/234.3; 360/235.4
[58] Field of Search ........................... 360/103, 234.3, 360/235.4, 703–104

[56] References Cited

U.S. PATENT DOCUMENTS

| | | | |
|---|---|---|---|
| 4,894,740 | 1/1990 | Chhabra et al. | 360/103 |
| 5,359,480 | 10/1994 | Nepela et al. | 360/103 |
| 5,396,387 | 3/1995 | Murray | 360/103 |
| 5,442,850 | 8/1995 | Kerth | 360/103 |

FOREIGN PATENT DOCUMENTS

| | | | |
|---|---|---|---|
| 0558983 | 9/1993 | European Pat. Off. | 360/103 A |
| 54-8514 | 1/1979 | Japan | 360/103 A |
| 6-68633 | 3/1994 | Japan | 360/103 |
| 61-11509 | 4/1994 | Japan | 360/103 |

OTHER PUBLICATIONS

IBM Technical Disclosure Bulletin (vol. 34, No. 48, Sep. 1991).

Primary Examiner—Allen T. Cao
Attorney, Agent, or Firm—Ronald P. Kananen; Rader, Fishman & Grauer

[57] ABSTRACT

A flying type head slider is provided having a rear surface faced to a magnetic disk for recording and/or reproducing signal on or from a magnetic disk. The flying type head slider includes a center rail formed on the rear surface extending from a front end to a back end of the slider, a magnetic head mounted at the back end of the center rail and a pair of two rails also formed on the rear surface respectively located at both sides of the center rail. The two rails respectively have an inner side wall facing to a side wall of the center rail and an outer side wall. The both side walls are tapered and not parallel relatively to the side wall of the center rail so that the magnetic head can be floated by flying force cause by air flow between the rails and a surface of rotating magnetic disk.

9 Claims, 17 Drawing Sheets

F I G. 16
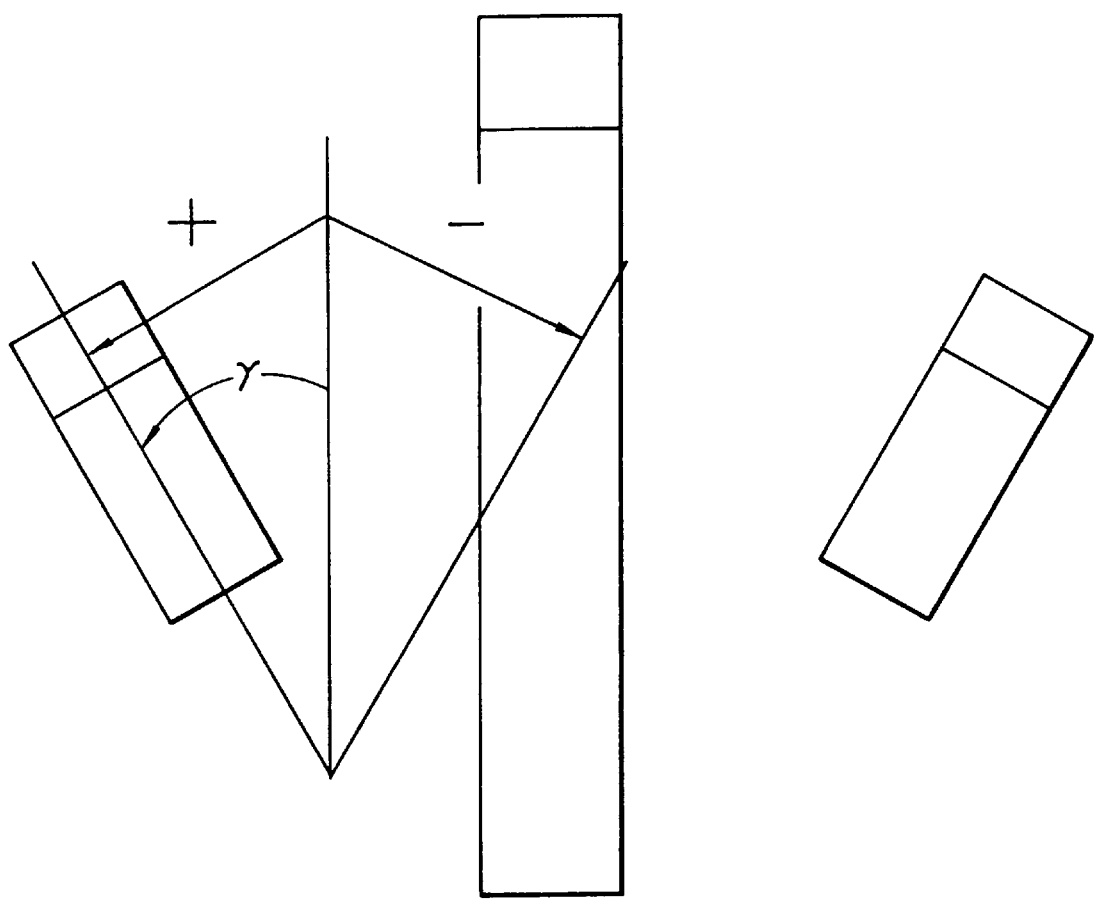

FLYING TYPE HEAD SLIDER AND DISK DRIVE APPARATUS WITH THE FLYING TAPE HEAD SLIDER

FIELD OF THE INVENTION

This invention relates to a flying type head slider having a magnetic head which is used to record and/or reproduce signal on and from a recording medium such as a magnetic disk or a magneto-optical disk. It also relates to a disk drive apparatus equipped with such a flying type head slider.

BACKGROUND OF THE INVENTION

Conventional disk drive apparatus of the type disclosed in FIG. 21, that are built-in or connected with equipment such as computers. In FIG. 21, the disk drive apparatus has a chassis 2 made of a die cast Aluminum. A spindle motor 9 is mounted on a rear surface of the chassis 2. Dual sided disks 3 are driven by the spindle motor 9 to rotate at a constant angular velocity (CAV).

An arm 4 is mounted on the chassis 2 so as to be pivotal around a perpendicular axis 4*a*. At one end of this arm, a voice coil 5 is mounted while at a second end thereof, a slider 6 is mounted.

On the chassis 2, magnets 7*a* and 7*b* are mounted so as to face with voice coil 5. A voice coil motor 7 comprises the voice coil 5 and the magnets 7*a* and 7*b*. When an electric current is supplied to the voice coil 5, the arm 4 rotates around the perpendicular axis 4 by means of the force caused between the magnetic field from the magnet 7*a* and 7*b* and the electric current supplied to this voice coil 5. By this force, the slider 6 at the second end of the arm 4 moves in a substantially radial direction of the magnetic disk 3 as shown by an arrow X in FIG. 22.

Therefore, a magnetic head 8 fixed to this slider 6 in the manner shown in FIG. 13 performs a SEEK operation to the magnetic disk 3. Thus, recording and reproducing information can be performed on selected tracks of the magnetic disk 3. This slider 6 is constructed as shown in FIG. 23. In other words, rails 6*a* and 6*b* which are formed at both ends of a bottom surface of the slider 6, cooperate to form an air bearing surface. Tapered portions 6*c* and 6*d* are formed on these rails 6*a* and 6*b* at an air entrance end.

By means of these tapered rails, air flow is generated between a surface of the magnetic disk 3 and the rails 6*a* and 6*b* of slider 6 as the magnetic disk rotates. Therefore, when the slider 6 accesses the rotating magnetic disk 3, the slider is provided with a supportive "flying" force.

By this flying force, the slider 6 and the magnetic head 8 mounted thereon float a small distance above a surface of the magnetic disk 3. Since there is no direct contact between the magnetic head 8 and a surface of magnetic disk 3, abrasion and damage of the magnetic disk 3 can be avoided.

By constructing this flying type head slider 6 as described above, the floating distance (d) of the magnetic head 8 from the magnetic disk 3 can be maintained constant for each track, even though the magnetic disk 3 has a "bumpy" surface as shown in FIG. 24.

When the magnetic disk 3 rotates at a constant angular velocity with the above flying type head slider 6, the linear velocity at outer periphery is higher than that at an inner periphery. Therefore, this causes a problem that the floating distance (d) of the slider 6 exhibits a relatively large variation depending on whether the slider 6 is located at the outer periphery or the inner periphery of the magnetic disk 3.

When the arm 4 rotates around the perpendicular axis 4*a*, the slider 6 moves through an arc, and not along a straight line as it moves in a radial direction towards the center of the magnetic disk 3, as shown in FIG. 25. Therefore, as shown in FIG. 26, a center line 6*e* of this slider 6 becomes offset with respect to a tangential line of a track 3*a*. This causes the skew angle θs. The skew angle θs varies depending on the distance from the center of magnetic disk 3.

The flying force acting on the slider 6 also varies as the skew angle varies by means of the air flow generated between the surface of magnetic disk 3 and the rails 6*a* and 6*b* of the slider 6 as the magnetic disk 3 rotates. Once the floating distance (d) varies depending on the skew angle θs, it causes a problem that accurate recording and reproducing can not be performed on desired tracks.

An improvement has been proposed such disclosed in U.S. Pat. No. 4,894,740 in which three rails are formed on the bottom surface of the slider. A wall or walls of a rail which is faced with another wall of another rail is tapered or flared so as to resolve the above problem. However, even with this arrangement a stabilized floating height could not be satisfactorily obtained.

SUMMARY OF THE INVENTION

It is therefore an object of the invention to provide an improved flying type head slider or a disk drive apparatus in which the floating distance of the slider remains constant irrespective of the variation of skew angle or the position along a radial direction of recording medium.

It is another object of the invention to provide an flying type head slider with three rails in which preferred angles between the center rail and side rails are provided so as to minimize the floating variation between the head and recording medium.

In one aspect of the present invention, a flying type head slider has a rear surface facing a magnetic disk for recording and/or reproducing a signal on or from the magnetic disk. The flying type head slider includes: a center rail formed on a rear surface which extends from a front end to a back end of the slider, a magnetic head mounted at the back end of the center rail, and a pair of rails formed on the rear surface and respectively located on either side of the center rail. The two rails respectively have an inner side wall facing a side wall of the center rail and an outer side wall. The side walls of the rails are tapered and are not parallel relative to the side wall of the center rail so that the magnetic head can float on the flying force produced by the air flow between the rails and a surface of rotating magnetic disk.

In accordance with the present invention, when the flying type head slider approaches the rotating surface of magnetic disk, the flying type head slider is exposed to a flying force generated by the air flow between the three rails and the surface of magnetic disk as the disk rotates. Due to this flying force, the slider and magnetic head mounted thereon float a small distance (flying distance) from a surface of the magnetic disk. Since the magnetic head doesn't directly contact the surface of the magnetic disk, abrasion and damage of this magnetic disk can be avoided.

With the pair of rails onn either side of the center rail, the flying force caused by the air flow becomes relatively large. In case of that the relative speed between the magnetic disk is low, sufficient flying force is produced.

Further, the pair of rails are tapered in opposite directions. Therefore, when the skew angle of the flying type head slider changes with respect to the tangential direction of tracks on the magnetic disk, the total flying force received by the two rails can be maintained approximately constant.

Therefore, the floating distance of the flying type head slider from a surface of this magnetic disk can be also maintained approximately constant, even when this flying type head slider radially changes its position and the skew angle is varied. Accordingly, precisely accurate recording and reproducing can be performed on any desired track.

These and other objects, advantages and features of the invention will become apparent to those skilled in the art upon consideration of the following description of the invention.

BRIEF DESCRIPTION OF THE DRAWINGS

FIG. 16 shows a definition of rail angle y of the first and third sliders shown in FIGS. 7 and 9;

DETAILED DESCRIPTION OF THE PREFERRED EMBODIMENTS

Figure 1:
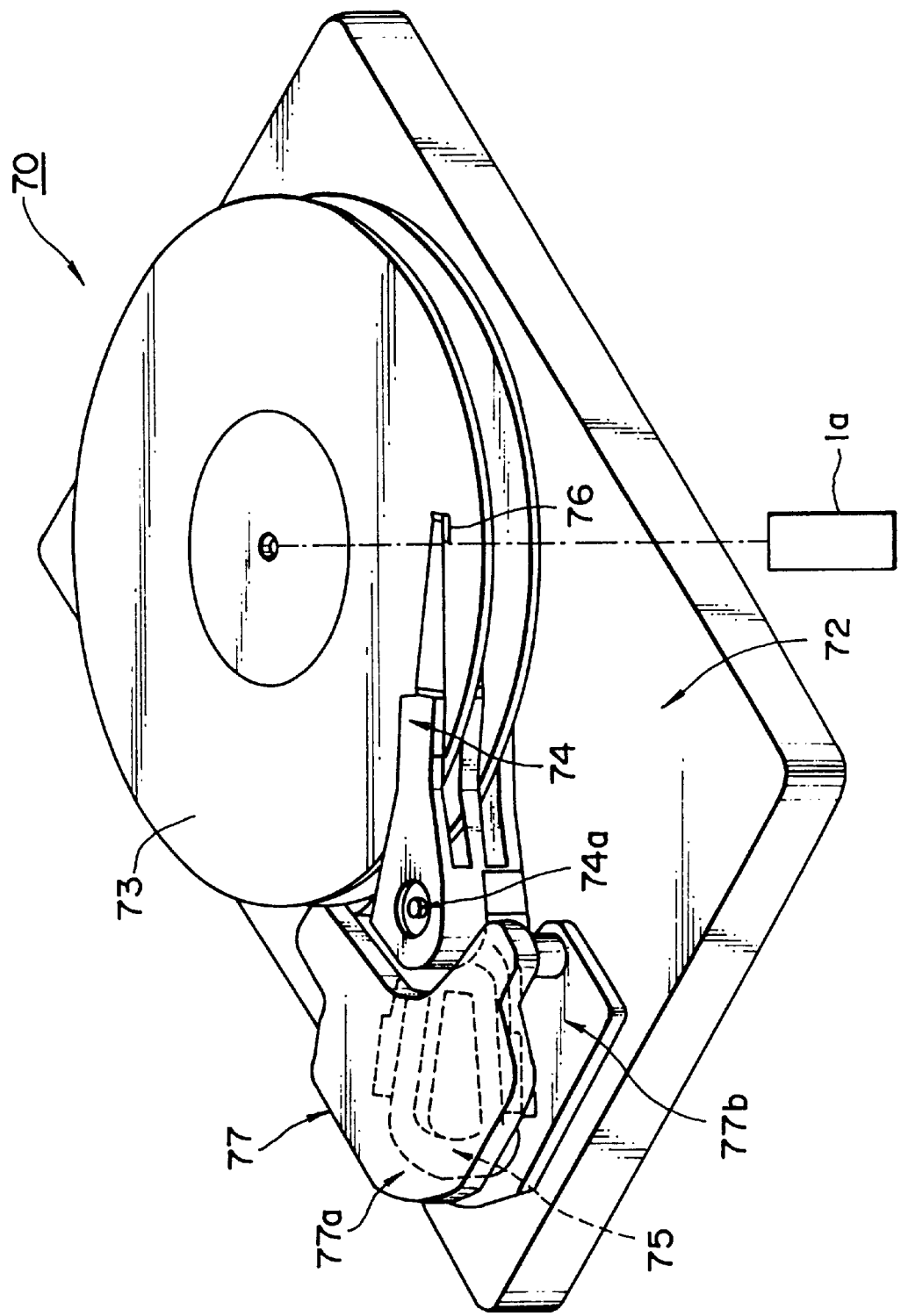
FIG. 1 shows a perspective view of a disk drive apparatus according to an embodiment of the invention.
Figure 2:
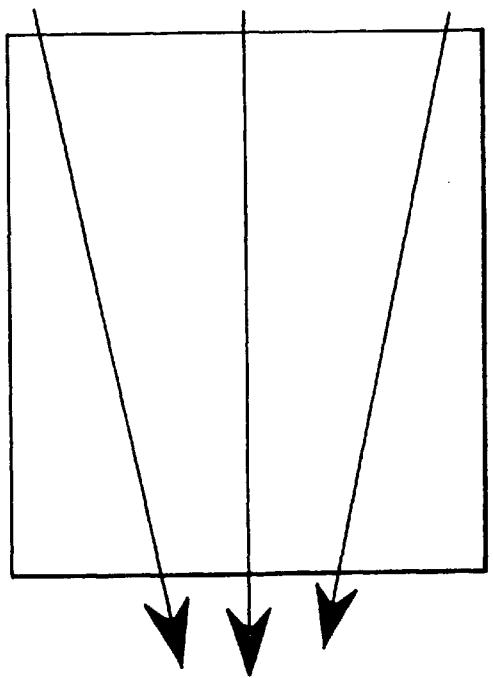
FIG. 2 shows preferred directions of air flows to stabilize the flying distance of head slider.

Referring now to FIG. 1, a disk drive apparatus 70 has a cabinet 72 made of a metal such as Die Cast Aluminum. A spindle motor 1a is mounted on a rear surface portion of the cabinet 72. A dual sided magnetic disk 73 is supported on another surface of the cabinet 72, and is driven at a constant angular velocity.

An arm 74 is pivotablely mounted around a perpendicular axis 74a on this cabinet 72. At one end of the arm 74, a voice coil 75 is mounted and at another end of the arm 74, a slider 76, which will be described more in detail later, is attached. A pair of magnets 77a and 77b are also attached to the cabinet 72 so as to sandwich the voice coil 75 therebetween. A voice coil motor 77 is formed with the above mentioned voice coil 75 and magnets 77a and 77b.

When electric current is applied to the voice coil 75, the arm 74 rotates around the perpendicular axis 74a by means of a force generated between the magnetic field caused by magnets 77a and 77b and the electric current through the voice coil 75.

Figure 22:
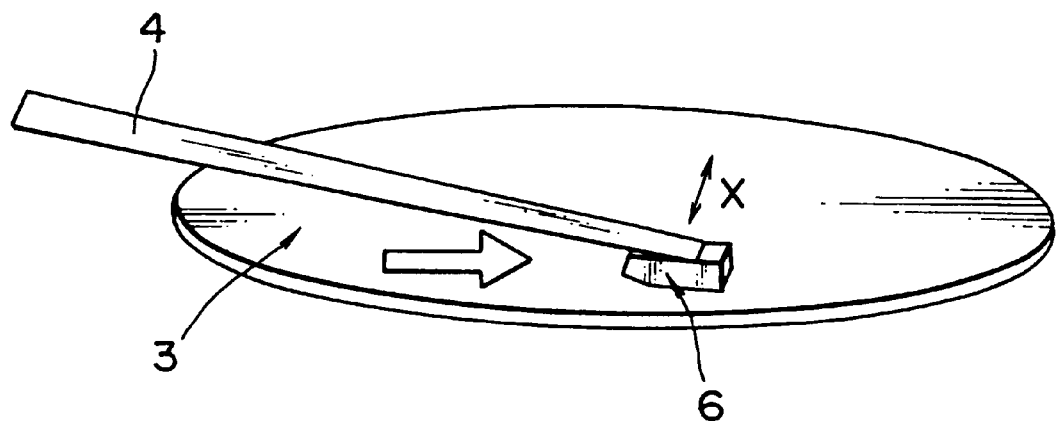
FIG. 22 shows a perspective view showing a relation between the magnetic disk and head in the apparatus shown in FIG. 21.

The slider 76 attached at another end of the arm 74, therefore, moves substantially along a radial direction of the magnetic disk 73 as shown by arrow (X) in FIG. 22.

Thus, a magnetic head 78 which is mounted on the slider 76 performs a seeking operation (SEEK) on the magnetic disk 73. The recording and reproducing information is performed on the magnetic disk on a certain track of the magnetic disk 73.

Since the slider 76 of this invention is used in this disk drive apparatus 70, precisely accurate recording and reproducing can be performed.

With respect to the basic concept of the invention, the configuration of the rails on the slider 76, FIGS. 2 to 6 will be explained next. As shown by arrows in FIG. 2, only the air flows along the three illustrated directions are generated in order to obtain a stabilized floating distance.

Figure 3:
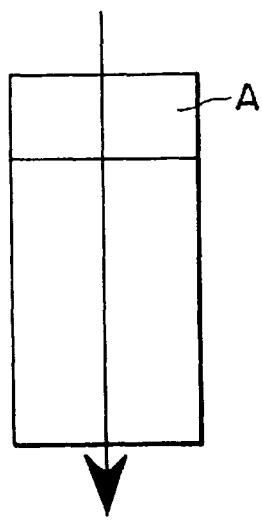
FIGS. 3 to 6 respectively show a direction of air flow retrieved by a rail with a respective configuration.
Figure 4:
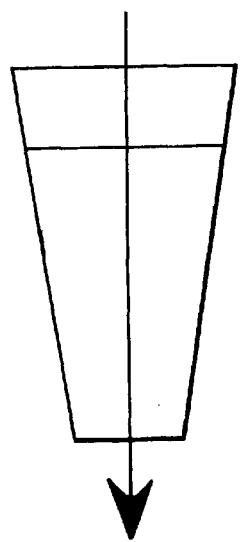

Considering a single rail is formed on the rear surface of the slider 76 with FIG. 3, an air flow which follows the direction of the arrows is predominantly generated. When the configuration of the rail is slightly modified so as to symmetrically tapered as shown in FIG. 4, the direction of the air flow doesn't change. In other words, it remains as indicated by the arrow in FIG. 4.

Figure 5:
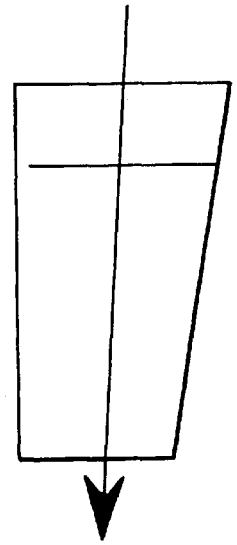

When the configuration of the rail is modified in an unsymmetrical manner as shown in FIG. 5, the direction of the air flow changes slightly. In other words, the air flow along the direction of the slightly inclined arrow is predominantly generated as shown in FIG. 5.

Figure 6:
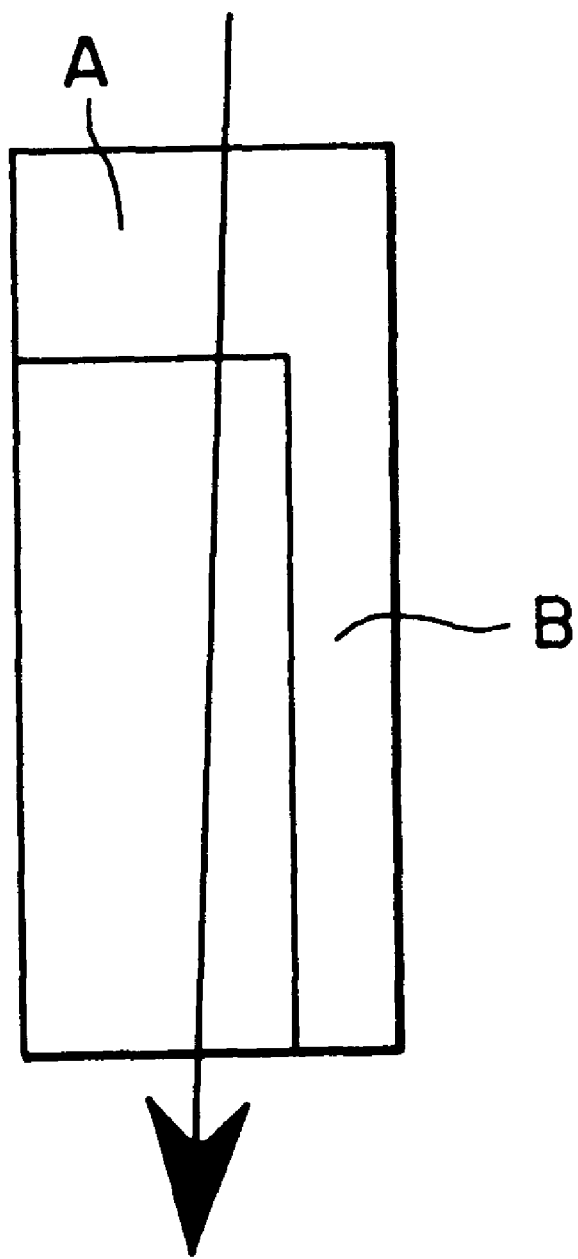

It is also realized that an air flow along a direction of the slightly inclined arrow is predominantly generated as shown in FIG. 6 when a tapered portion (B) is formed along the length of one side of the rail in addition to the tapered portion (A) at the air entrance.

The results demonstrated in FIGS. 2 to 6, are achieved with the preferred rail configurations shown in FIGS. 7 to 12.

Figure 7:
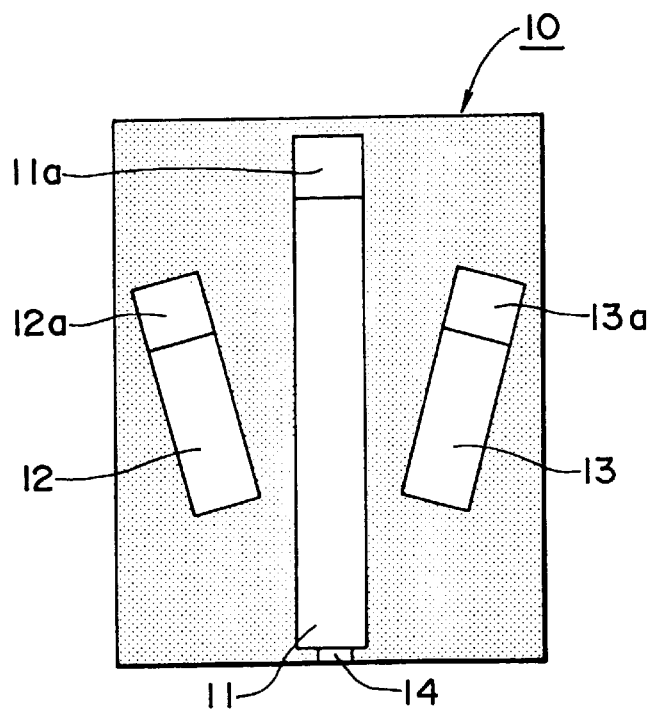
FIG. 7 shows a first embodiment of flying type head slider in accordance with the invention.

FIG. 7 shows a first embodiment of the flying type head slider. In this embodiment, the slider 10 has three rails 11, 12 and 13 which are provided on its rear surface (viz., the surface facing the disk being assessed). These rails function to provide air bearing surfaces.

The first rail 11 extends beneath the rear surface of slider 10 along an approximately center line of the rear surface. The second and third rails are located on either side of the first rail 11 and are arranged symmetrically with respect to the first rail 11. The second and third rails are arranged so as to be angled open at the air entrance end of the slider 10 (upper side of the drawing).

Each of the rails 11, 12 and 13 respectively has a tapered portion 11a, 12a, and 13a at the ends facing the air entrance. The second and third rails 12 and 13 respectively are shorter in length than the first rail 11, and are positioned at a center portion of the slider 10.

When the slider 10 approaches the rotating surface of magnetic disk, the slider 10 receives a flying force generated by the air flow between these rails 11, 12 and 13 and the surface of magnetic disk as the disk rotates. Due to this flying force, the slider 10 and magnetic head 14 mounted thereon, float and run at a small distance (flying distance) from surface of the magnetic disk. Since the magnetic head doesn't directly contact with a surface of the magnetic disk, abrasion and damage of this magnetic disk is avoided.

With these second and third rails 12 and 13, the flying force caused by the air flow becomes relatively large. Therefore, when the relative speed between the magnetic disk is low, still sufficient flying force is generated.

Further, the second and third rails 12 and 13 are angled in opposite directions. Therefore, when the skew angle of the flying type head slider 10 changes towards the tangential direction of tracks on the magnetic disk, the total flying force generated by the second and third rails 12 and 13 can be maintained approximately constant.

Therefore, the floating distance of the flying type head slider 10 from a surface of this magnetic disk can be also maintained approximately constant, even when this flying type head slider 10 changes its position in a radial direction and the skew angle is varied. Precisely accurate recording and reproduction can therefore be performed on desired tracks.

Figure 8:
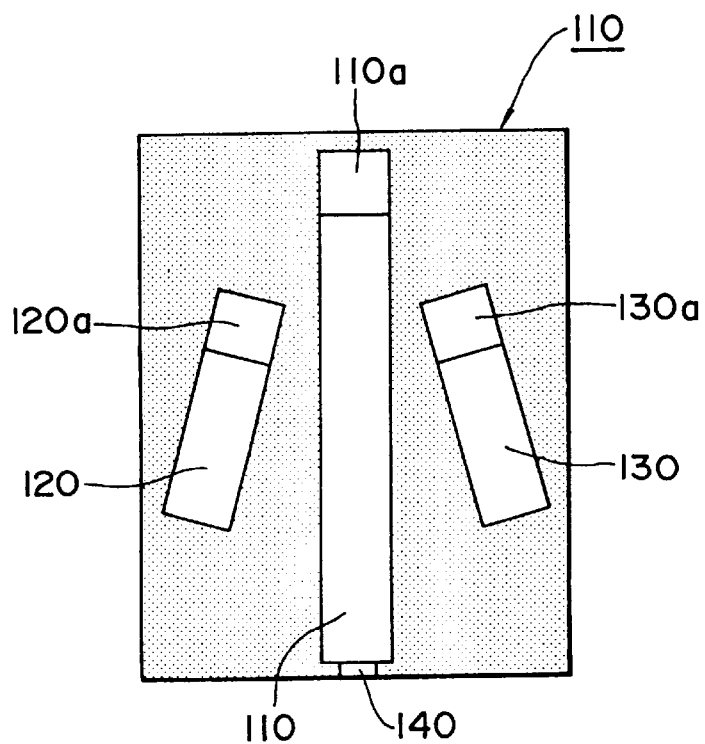
FIG. 8 shows a second embodiment of flying type head slider in accordance with the invention.

FIG. 8 shows a second embodiment of the flying type head slider according to the invention, wherein three rails 110, 120 and 130 that function to provide air bearing surfaces, are provided on its rear surface.

The first rail 110 extends beneath the rear surface of slider 100 along an approximately center line of the rear surface. The second and third rails are located on either side of the first rail 110 and are symmetrical with respect to the first rail 110.

Each of the rails 110, 120 and 130 respectively has a tapered portion 110a, 120a, and 130a at the ends facing the air entrance end of the slider. The second and third rails 120 and 130 are shorter than that of the first rail 110. They are positioned at approximately the slider 10 center.

The above configuration is quite similar to the flying type magnetic head slider 10 in FIG. 7. However, in this embodiment, the second and third rails 120 and 130 close toward each other in the direction of the air entrance end of the slider. This is the main difference between the first and second embodiments.

The flying type head slider 100 operates similarly to the flying type head slider 10 in FIG. 7. The slider 100 and the magnetic head 140 mounted thereon can be driven while floating at a small distance (flying distance) from a surface of the magnetic disk.

The floating distance of the flying type head slider 100 from a surface of this magnetic disk can be also maintained approximately constant, even when this flying type head slider 100 changes position radially and the skew angle is varied. Precisely accurate recording and reproduction can be performed on a desired track.

Figure 9:
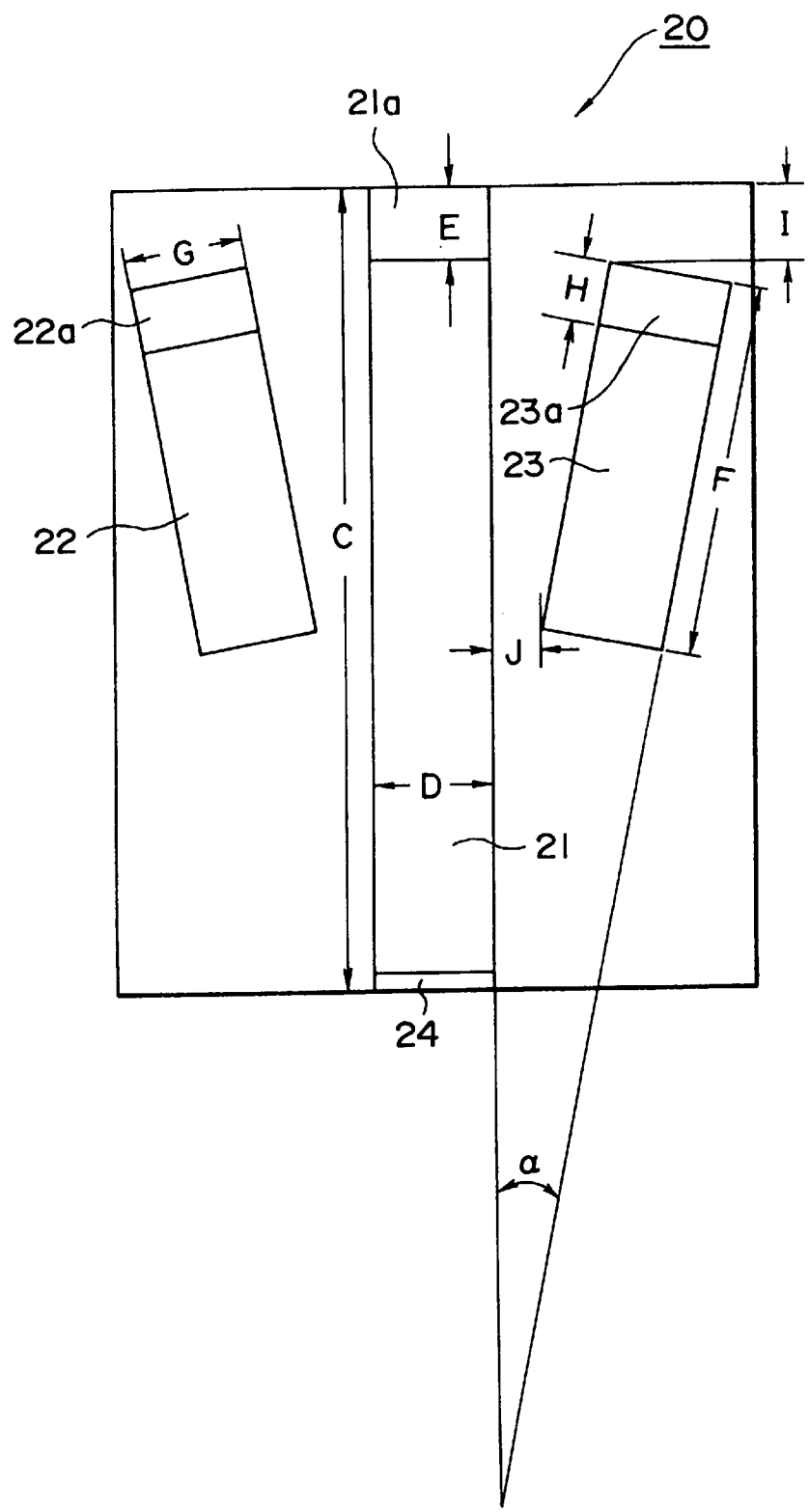
FIG. 9 shows a third embodiment of flying type head slider in accordance with the invention.

FIG. 9 shows the third embodiment of the flying type head slider of the invention. In this embodiment, the slider 20 has three rails 21, 22 and 23 provided on its rear surface. These rails function to provide air bearing surfaces.

The configuration of these three rails 21, 22 and 23 are quite similar to those 11, 12 and 13 of the flying type magnetic head slider 10 in FIG. 7. However, the second and third rails 22 and 23 have offset positions and are located closer to the front end of the slider 20. The detailed differences between the first and third embodiments are discussed later.

Figure 10:
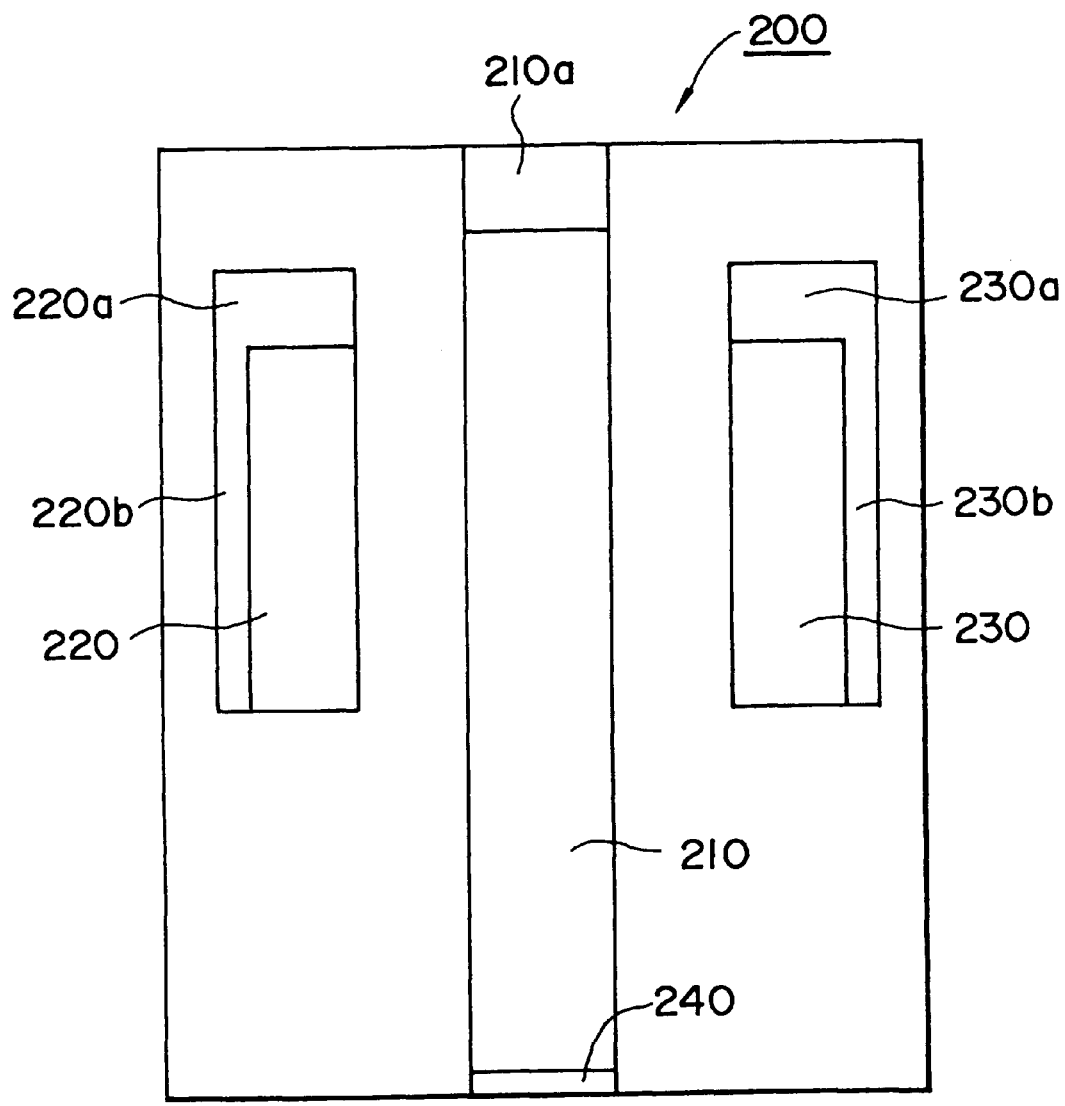
FIG. 10 shows a fourth embodiment of flying type head slider in accordance with the invention.

FIG. 10 shows the fourth embodiment of the flying type head slider of the invention. This fourth embodiment is provided with a slider 200 which has three rails 210, 220 and 230 which function to provide air bearing surfaces, provided on its lower surface.

The first rail 210 extends beneath the rear surface of slider 200 along an approximately center line of the rear surface. The essentially parallel second and third rails are located on either side of the first rail 210 and are symmetrical with respect to the first rail 210.

Each of the rails 210, 220 and 230 is provided with a tapered portion 210a, 220a, and 230a at the ends facing the air entrance. The second and third rails 220 and 230 are shorter in length than the first rail 210 and are positioned close to the front end of the slider 200.

The above configuration is quite similar to third embodiment shown in FIG. 9. However, in this embodiment the second and third rails 220 and 230 extend parallel to the first rail 210. Further, tapered or chamfered portions 220b and 230b are additionally formed along their outer side walls over the full length of rail. These are the main differences between the third and fourth embodiments.

As previously explained, an air flow which follows the direction of a slightly inclined arrow is predominantly generated in the manner shown in FIG. 6. Therefore, the flying type head slider 200 operates similarly to the flying type head slider 20 in FIG. 9.

The slider 200 and the magnetic head mounted thereon can be driven so as to float a small distance (flying distance) above a surface of the magnetic disk. The floating distance of the flying type head slider 200 from a surface of this magnetic disk can be also maintained approximately constant, even when this slider 200 changes position and the skew angle is varied. Precisely accurate recording and reproduction can be performed on a desired track.

Figure 11:
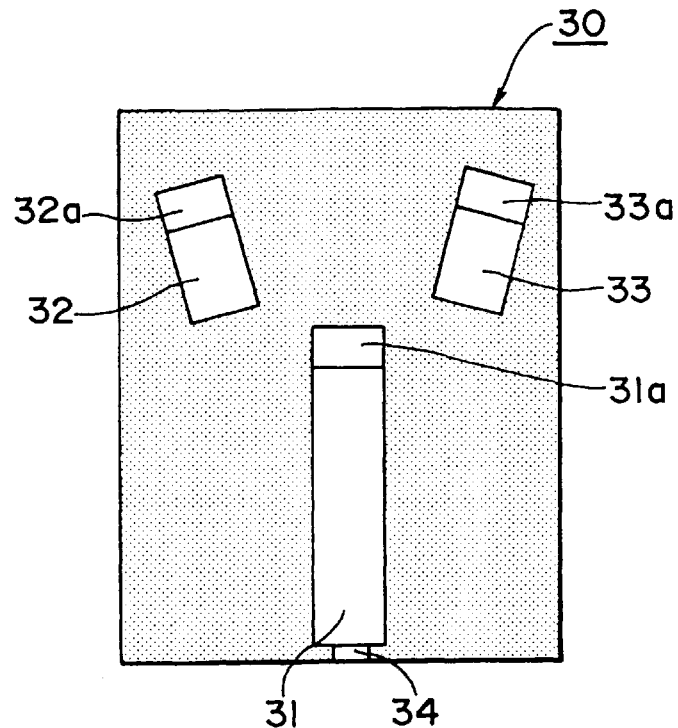
FIG. 11 shows a fifth embodiment of flying type head slider in accordance with the invention.

FIG. 11 shows the fifth embodiment of the flying type head slider of the invention. In this embodiment, a flying type head slider 30 has three rails 31, 32 and 33 on its rear surface.

The first rail 31 extends beneath the rear surface of slider 30 at a location offset toward the back side of the slider (lower side in FIG. 11). The second and third rails 32 and 33 are located on either side of the first rail 31 and are arranged so as to be symmetrical with respect to the first rail 31.

Each rails 31, 32 and 33 respectively has a tapered portion 31a, 32a, and 33a at the ends facing the air entrance. The second and third rails 32 and 33 are shorter length than the first rail 31, and they are located at a relatively forward location as compared with the first rail 31.

Further, the second and third rails 32 and 33 are arranged to be angled with respect to the air entrance (upper side of FIG. 11).

Therefore, the flying type head slider 30 operates similarly to the flying type head slider 10 in FIG. 7. The slider 30 and the magnetic head 34 mounted thereon can be driven so as to float at a small distance (flying distance) above a surface of the magnetic disk.

The floating distance of the flying type head slider 30 from a surface of this magnetic disk can be also maintained approximately at a constant, even when this flying type head slider 30 changes position and the skew angle is varied. Precisely accurate recording and reproduction can be performed on a desired track.

Figure 12:
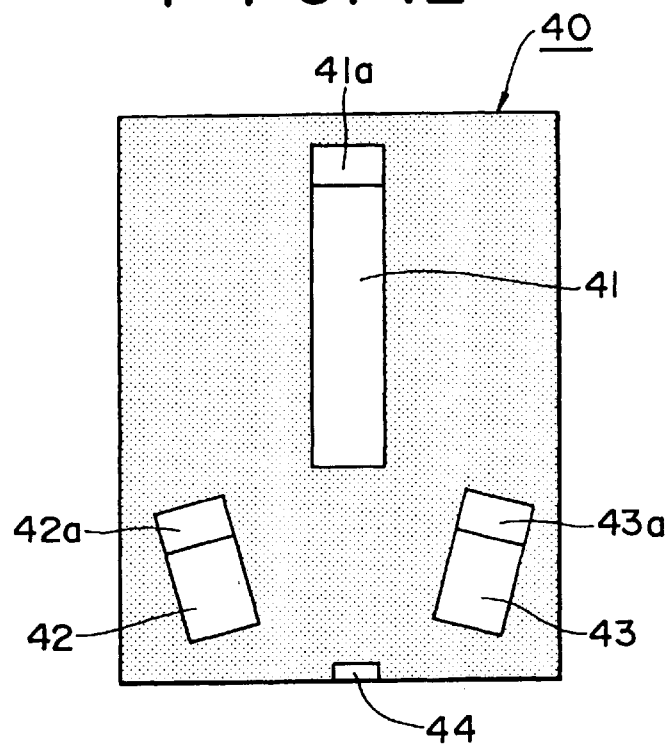
FIG. 12 shows a sixth embodiment of flying type head slider in accordance with the invention.

FIG. 12 shows the sixth embodiment of the flying type head slider of the invention. In this embodiment, a flying type head slider 40 has three rails 41, 42 and 43 on its rear surface. Each of the rails function to provide air bearing surfaces.

The first rail 41 extends beneath the rear surface of slider 40 at relatively forward location (upper side in FIG. 12). The second and third rails 42 and 43 are located on either side of the first rail 41 and are symmetrical with respect to the first rail 41.

Each rails 41, 42 and 43 respectively has tapered portions 41a, 42a, and 43a at their leading ends, viz., the ends facing the air entrance end of the slider. The second and third rails 42 and 43 are shorter length than the first rail 41, and are located at relatively rearward position as compared with the first rail 41.

Further, the second and third rails 42 and 43 open towards the air entrance end of the slider (upper side of FIG. 12).

Therefore, the flying type head slider 40 operates similarly to the flying type head slider 10 in FIG. 7. The slider 40 and the magnetic head 44 mounted thereon can be driven so as to float at a small distance (flying distance) from a surface of the magnetic disk.

The floating distance of the flying type head slider 40 from a surface of this magnetic disk can be also maintained approximately constant, even when this flying type head slider 40 changes its position and the skew angle is varied. Precisely accurate recording and reproduction can be performed on a desired track.

Referring back to FIG. 9, the preferred dimensions (A) to (J) are as follows.

First Rail 21

Length (C): 1.8 mm
Width (D): 0.253 mm
Tapered Length (E): 0.1 mm

Second and Third Rails 22 and 23

Figure 13:
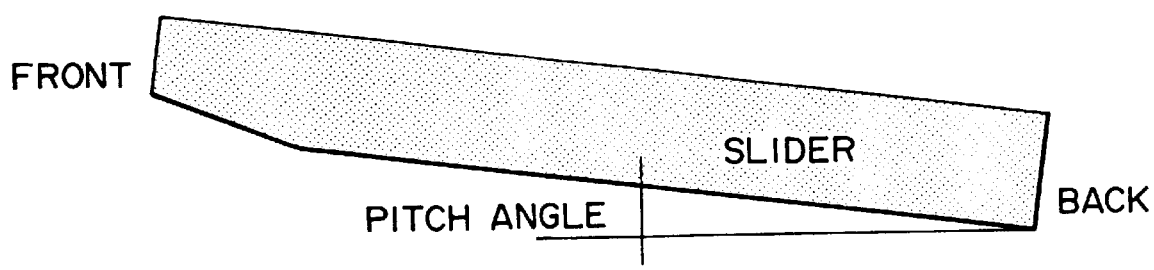
FIG. 13 shows a posture of the flying type head slider 20 shown in FIG. 9.

Length (F): 0.95 mm.
Width (G): 0.2 mm
Tapered Length (H): 0.4 mm
Tilted Angle ($\alpha$): 15 degree
Distance from the front tip of the first rail (I): 0.1 mm
Distance from the side end of the first rail (J): 0.3 mm As described earlier, the second and third rails 22 and 23 of the third embodiment of head slider 20 have offset positions which are located closer to the front of the slider 20. Compared with the first embodiment of head slider 10 in FIG. 7, the floating posture of the head slider 20 has a deeper pitch angle $\beta$ which is shown in FIG. 13. The slider 20 with this deeper pitch angle $\beta$ has the advantage of being able to get over dust or bumpy surface on the disk, and therefore avoid a collison between the head and the disk.

Figure 14:
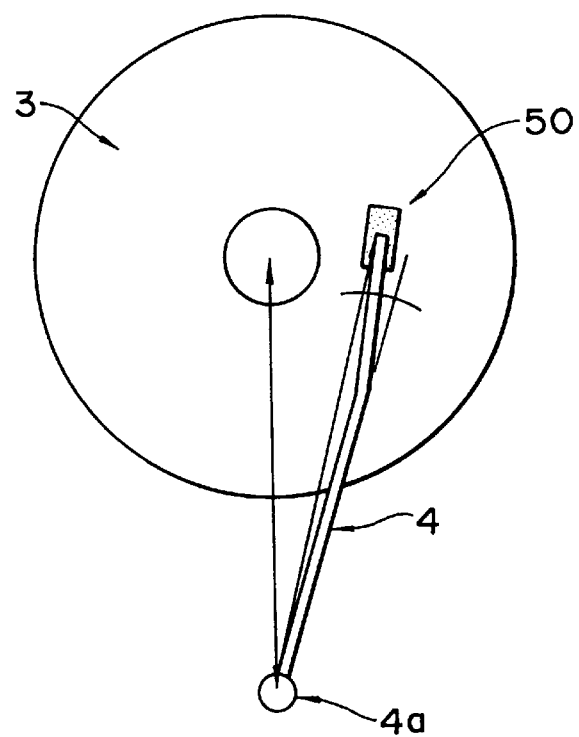
FIG. 14 shows a plan view of a disk drive apparatus of the invention to which the head sliders shown in FIGS. 7 to 12 are mounted.

The variation in floating distance is calculated using a computer simulation under the assumption that the head slider 20 with the above dimensions is attached to a hard disk drive apparatus as shown in FIG. 14. The dimensions of the hard disk drive apparatus are assumed as follows.

Hard Disk Drive

Figure 15:
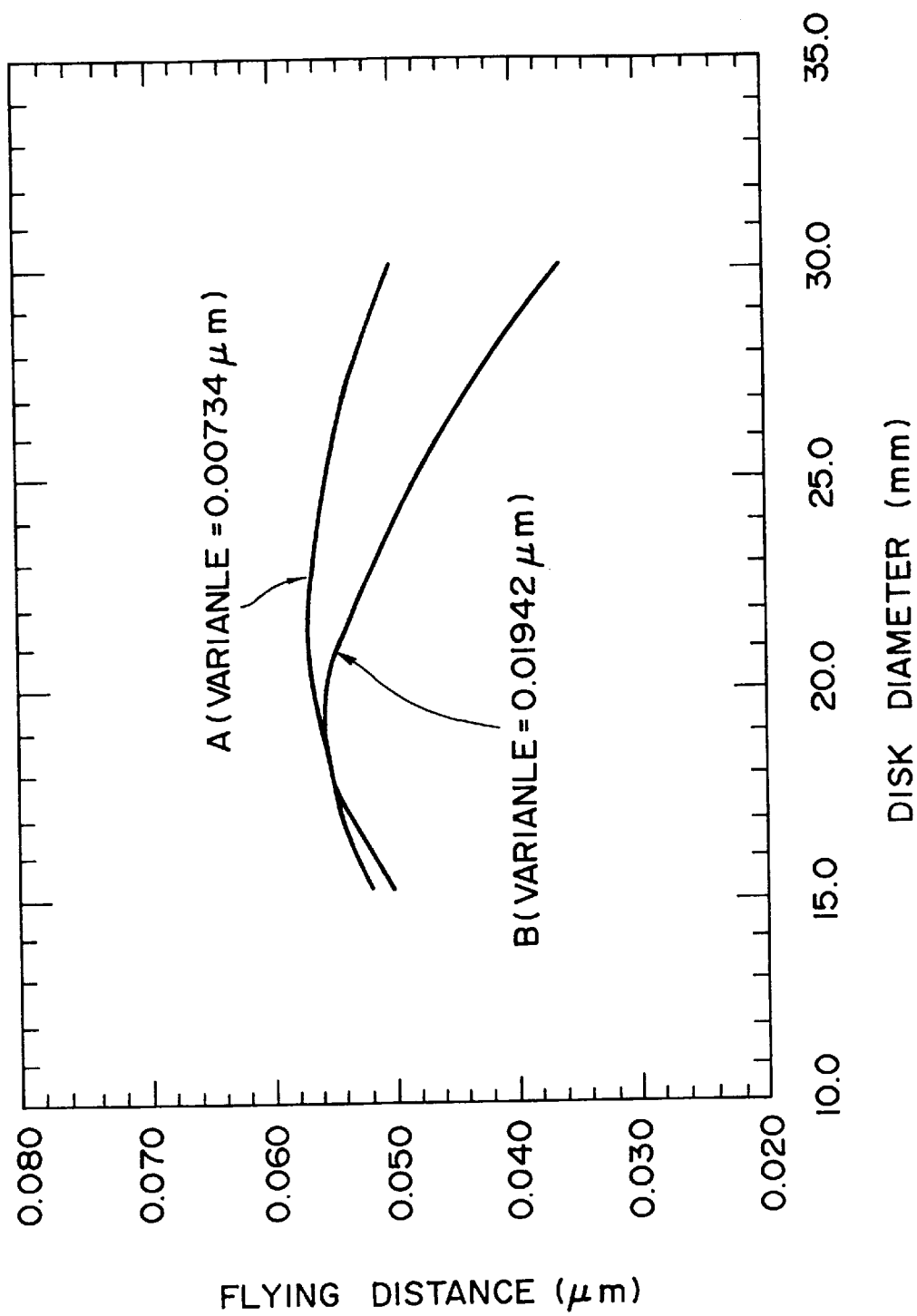
FIG. 15 shows a result of the comparison between the head slider shown in FIG. 9 and the conventional flying type head slider using computer simulation.

Distance between a center of disk and a pivot axis 4a (K): 40.5 mm
Arm length (L): 39.0 mm
Bent Angle ($\delta$): 10.0 degree
Seek Diameter: 15.0 mm to 30.0 mm A profile of the flying distance as shown by a curve (A) in FIG. 15 can be obtained by the above simulation. In case of the dimensions as defined above, the variation in flying distance of the slider 20 can be limited within a range of 0.00734 $\mu$m when the slider changes its position along a radial direction of the magnetic disk.

Figure 23:
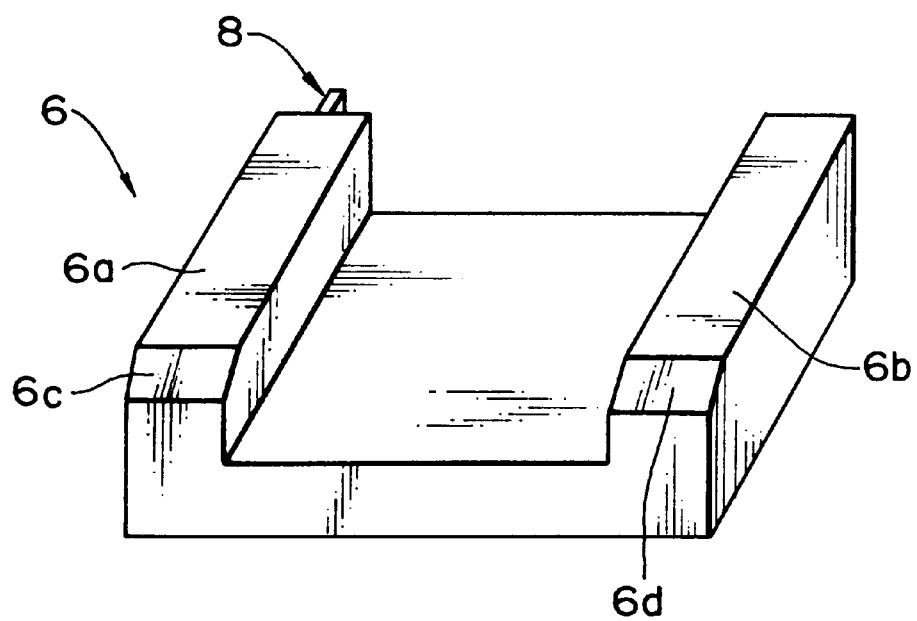
FIG. 23 shows a perspective view showing a flying type head slider of the apparatus shown in FIG. 21.
Figure 24:
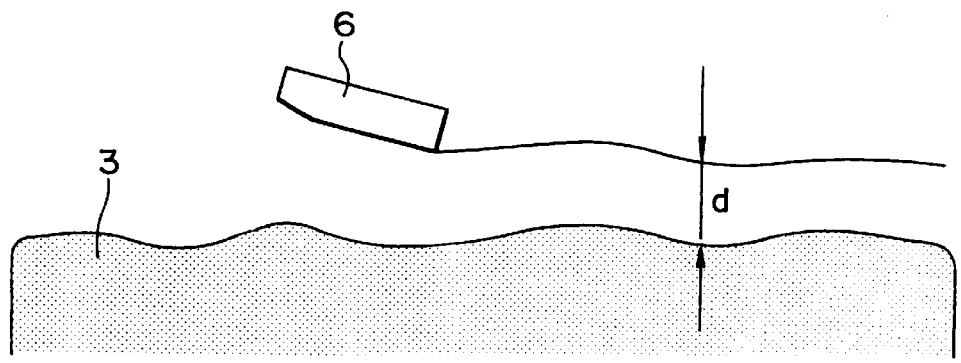
FIG. 24 shows a flying condition of the slider shown in FIG. 23.
Figure 25:
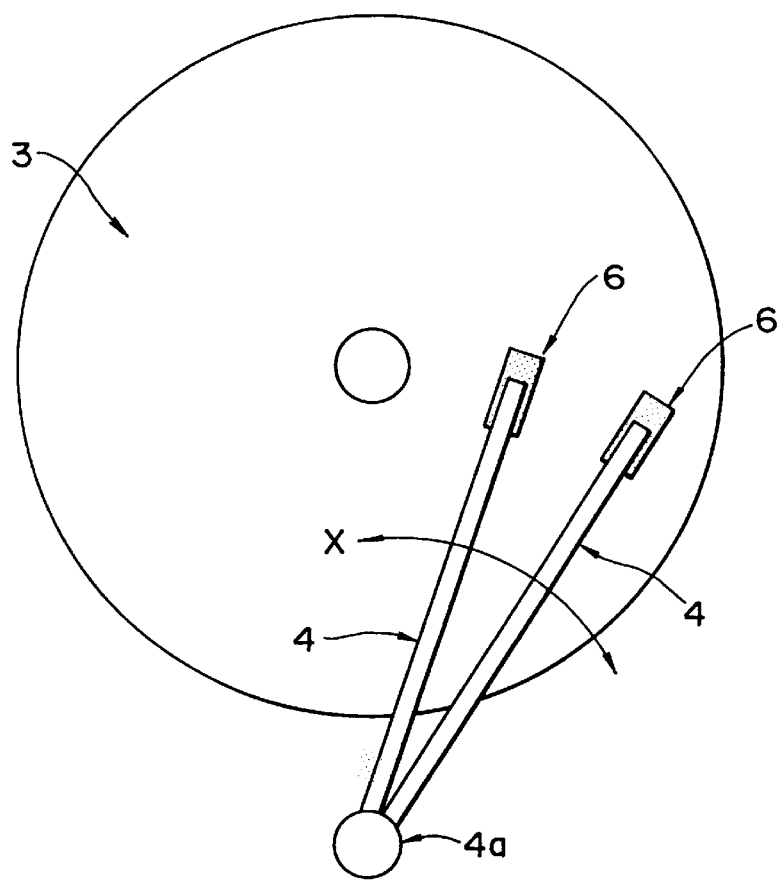
FIG. 25 shows a plane view of the arm shown in FIG. 22 at SEEK condition to the magnetic disk.
Figure 26:
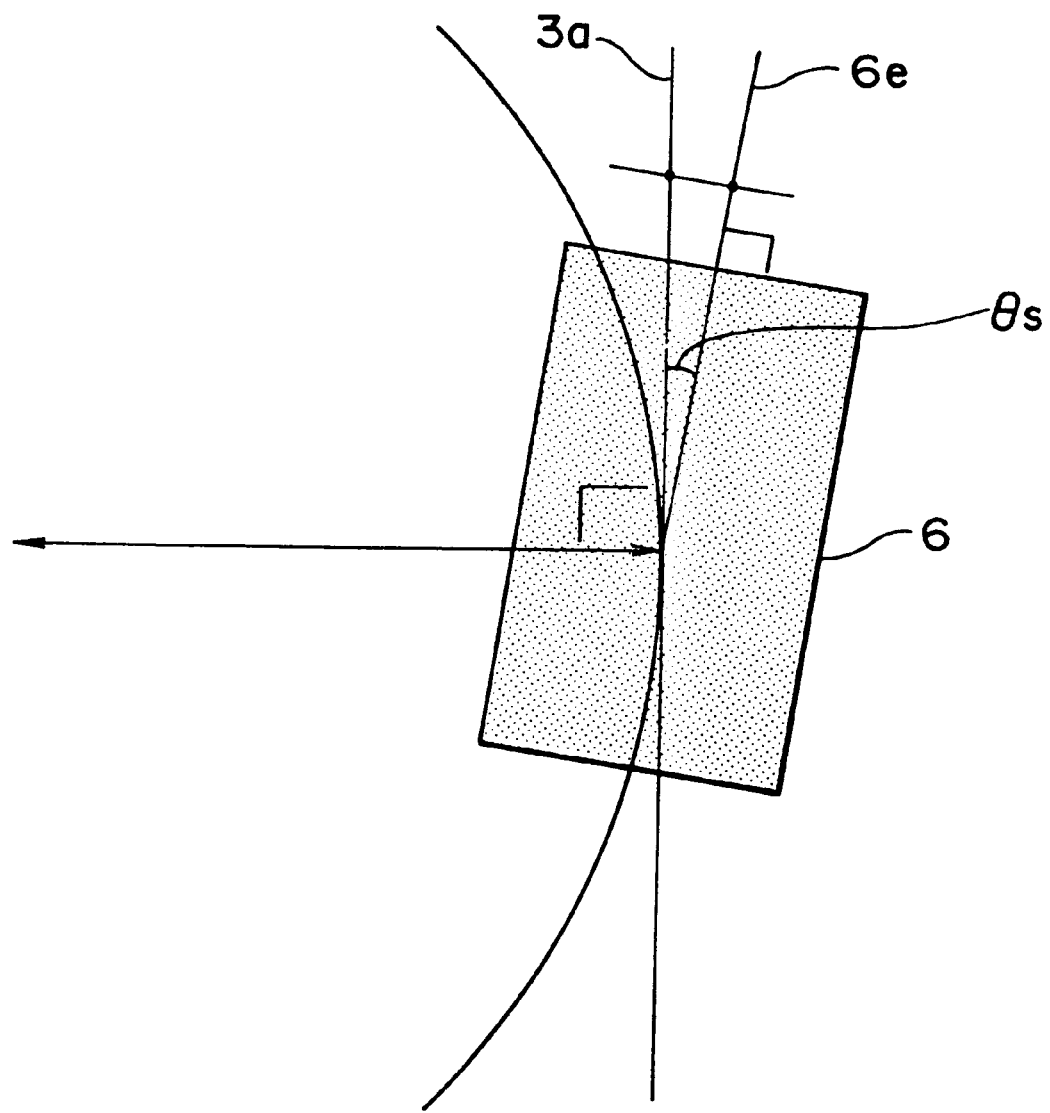
FIG. 26 shows a skew angle of the flying type head slider at the SEEK condition shown in FIG. 25.

A curve (B) in FIG. 15 shows, for a purpose of comparison, flying distance when the conventional flying type head slider 6 as shown in FIG. 23, is used. The flying type head slider 6 utilized here for the comparison is described more in detail with FIGS. 19 and 20 with its dimensions as follows.

The slider 6 (Conventional)

Slider length: 1.8 mm
Slider width: 1.6 mm
Slider thickness: 0.6 mm
Tapered length: 0.18 mm
Tapered angle: 0.85 degree
Rail width: 0.213 mm
Load to disk: 3.0 g It is apparent by comparing these curves (A) and (B) that the variation of flying distance is greatly limited by the flying type head slider 20 of the third embodiment of this invention.

Referring now to FIG. 16, an experiment was conducted by changing the angle y of the side rails towards the center rail. The change of angle y was tested on the first and third embodiments of slider 10 in FIG. 6 and slider 20 in FIG. 9. The results of the experiment are shown with the relation between the side rail angle $\gamma$ and the variation of flying distance.

Figure 17:
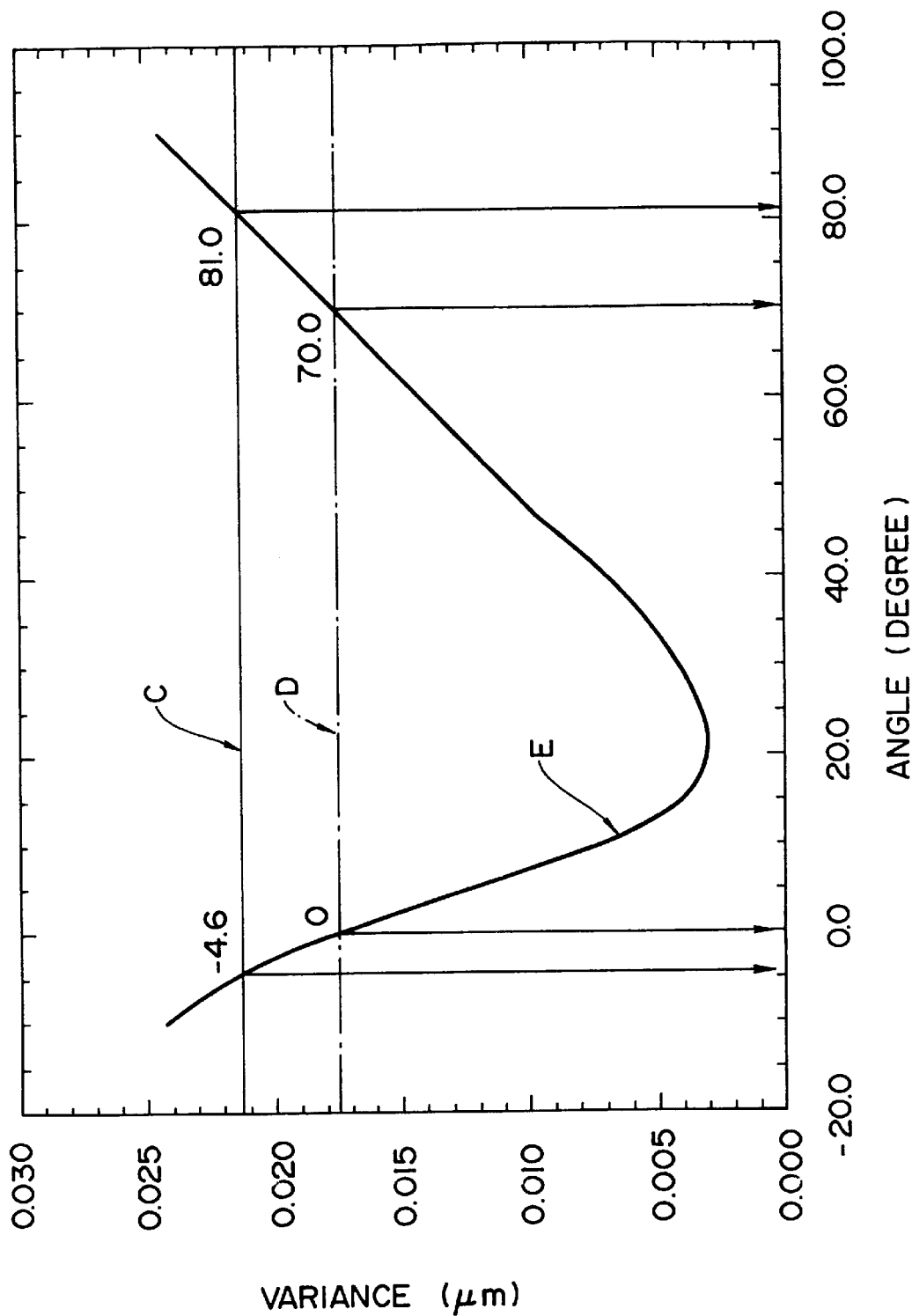
FIG. 17 shows the variance in flying distance with rail angle of the first slider shown in FIG. 7.

Referring now to FIG. 17, a curve (E) is plotted by changing the side rail angle $\gamma$ to the center rail 11 of the slider 10 shown in FIG. 10. Compared with a straight line (C) plotted with the slider having two parallel rails such as that shown in FIG. 23, the variance of flying distance of head 14 is smaller than that of head 8 in FIG. 23 within the range of $-4.6°<\gamma<81.0°$. Compared also with a dotted lines (D) plotted with a slider having three parallel rails, the variance of flying distance of head 14 is smaller than that with three parallel rails within the range of $0°<\gamma<70.0°$.

Figure 18:
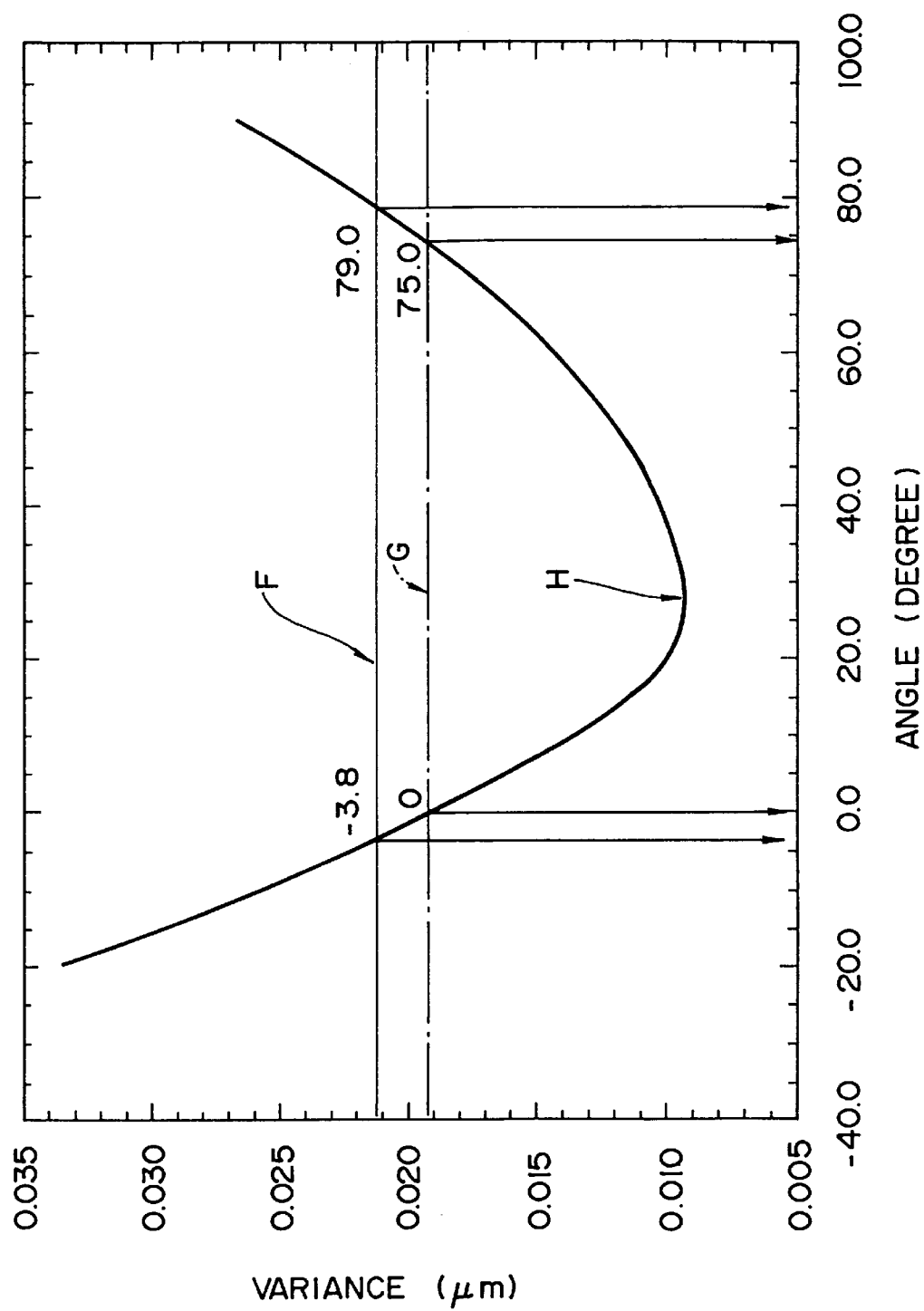
FIG. 18 shows the variance of flying distance with rail angle of the third slider shown in FIG. 9.

Referring now to FIG. 18, a curve (H) is plotted by changing the side rail angle $\gamma$ to the center rail 21 of the slider 20 shown in FIG. 9. The two rails 22 and 23 in FIG. 9 are 0.4 mm closer to the front end compared with the two rails 12 and 13 in FIG. 7. Compared with a straight line (F) plotted with the slider having two parallel rails such as that shown in FIG. 23, the variance of flying distance of head 24 is smaller than that of head 8 in FIG. 23 within the range of $-3.8°<\gamma<79.0°$. Compared also with a dotted lines (G) plotted with a slider having three parallel rails, the variance of flying distance of head 14 is smaller than that with three parallel rails within the range of $0°<\gamma<75.0°$.

Figure 19:
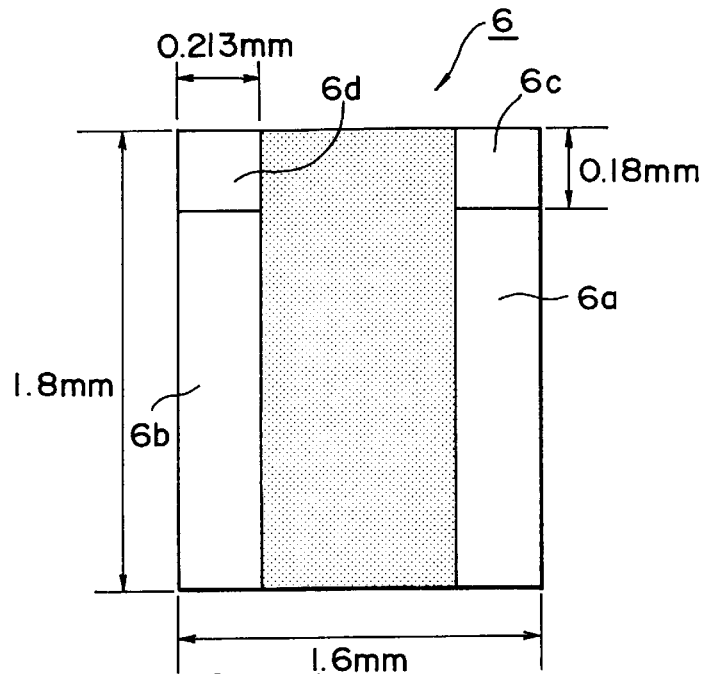
FIGS. 19 and 20 show detailed dimensions of the conventional flying type head slider utilized for the purpose of comparison.
Figure 20:
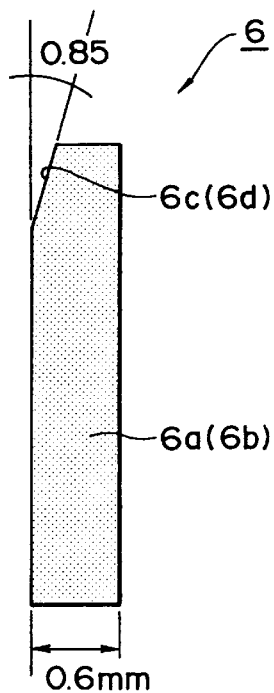
Figure 21:
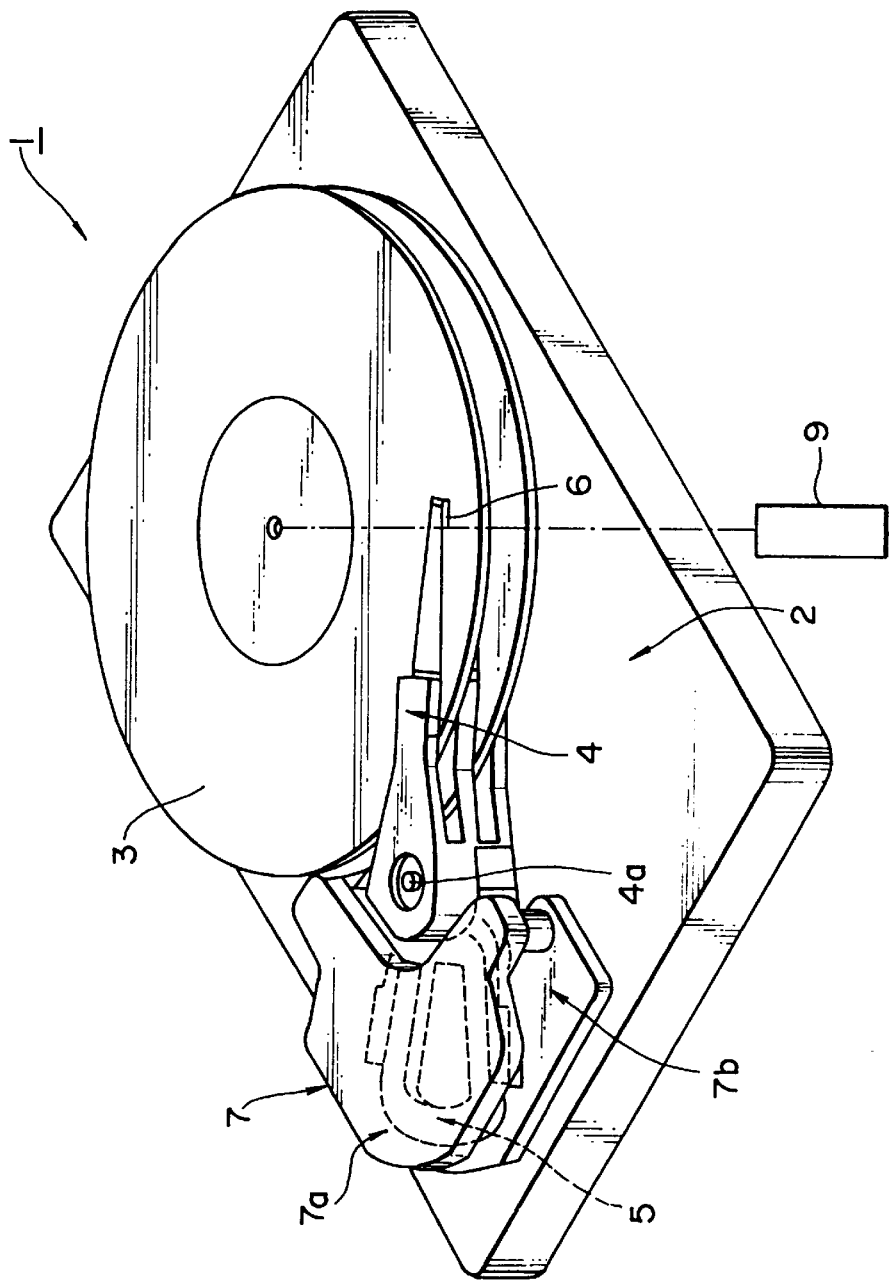
FIG. 21 shows a perspective view of a conventional disk drive apparatus.

Referring now FIGS. 19 and 20, the actual dimensions of the conventional flying type head slide 6 are described in detail to obtain the curve (B) in FIG. 15 and the straight lines (C) and (F) in FIGS. 17 and 18.

While specific embodiments of the invention have been shown and disclosed, it is to be understood that numerous changes and modifications may be made by those skilled in the art without departing from the scope and intent of the invention.

For example, the length of the two rails does not have to be shorter than that of the center rail. The width of the three rails does not have to be the same over their length.

What is claimed is:

1. A flying type head slider having a rear surface which faces a recording surface of a magnetic disk comprising:

a center rail formed on the rear surface of said slider, said center rail having a regularly rectangular shape with straight parallel side walls which extend along the full length of said center rail;

a magnetic head disposed on said slider so as to be aligned with said center rail and proximate an edge of said slider;

a pair of side rails formed on the rear surface of said slider, said pair of side rails respectively having regular rectangular shapes with straight parallel inner and outer side walls which extend along the full length of each side rails, said side rails being respectively located on either side of said center rail, the inner side walls of said side rails respectively facing a side wall of the center rail, the outer side walls of said side rails having a surface which is angled relative to a side wall of the center rail such that the magnetic head floats above the recording surface of the magnetic disc on a supporting force generated by air flowing between the rails and the recording surface of the rotating magnetic disk, wherein said side rails have chamfer-like tapered portions and are symmetrically disposed on the rear surface in a non-parallel angled relationship with respect to the center rail.

2. A flying type head slider according to claim 1, wherein said slider has a front and a rear and wherein said side rails are angled so as to open with respect to the flow of air which flows from an air entrance side located at the front of said slider, toward said magnetic head which is located at the rear of said slider.

3. A flying type head slider according to claim 1, wherein said side rails are shorter in length than said center rail.

4. A flying type head slider according to claim 1, wherein said side rails are each arranged at an angle of γ with respect to said center rail and wherein said angle γ is within a range of 0<γ<70 degrees.

5. A flying type head slider according to claim 1, wherein said slider has a front and a rear, wherein said center rail has a leading end and a trailing end, the leading end of said center rail being located proximate the front of said slider, wherein each of said side rails has a leading end and a trailing end and wherein each of said side rails are angled with respect to said center rail and so that the leading ends of said side rails are located further apart than the trailing ends of said side rails.

6. A flying type head slider according to claim 5, wherein the leading ends of said side rails are located closer to the rear of said slider than the trailing end of said center rail.

7. A flying type head slider according to claim 5, wherein said magnetic head is located at the rear of said slider and spaced from the trailing end of said center rail by a distance approximately equal to the length of one of said side rails.

8. A flying type head slider according to claim 5, wherein the leading ends of said side rails are located closer to the rear of said slider than the leading end of said center rail.

9. A flying type head slider having a rear surface which faces a recording surface of a magnetic disk comprising:

a center rail formed on the rear surface of said slider, said center rail having a regularly rectangular shape with straight parallel side walls which extend along the full length of said center rail;

a magnetic head disposed on said slider so as to be aligned with said center rail and proximate an edge of said slider;

a pair of side rails formed on the rear surface of said slider, said pair of side rails respectively having regular rectangular shapes with straight parallel inner and outer side walls which extend along the full length of each side rails, said side rails being respectively located on either side of said center rail, the inner side walls of said side rails respectively facing a side wall of the center rail, the outer side walls of said side rails having a surface which is angled relative to a side wall of the center rail such that the magnetic head floats above the recording surface of the magnetic disc on a supporting force generated by air flowing between the rails and the recording surface of the rotating magnetic disk, wherein said slider has a front and a rear, wherein said center rail has a leading end and a trailing end, the leading end of said center rail being located proximate the front of said slider, wherein each of said side rails has a leading end and a trailing end and wherein each of said side rails are angled with respect to said center rail and so that the leading ends of said side rails are located further apart than the trailing ends of said side rails, wherein said side rails have chamfer-like tapered portions and are symmetrically disposed on the rear surface in a non-parallel angled relationship with respect to the center rail, and wherein said magnetic head is located at the rear of said slider and immediately adjacent the trailing end of said center rail.

* * * * *